US007684673B2

(12) United States Patent
Monroe (10) Patent No.: US 7,684,673 B2
(45) Date of Patent: Mar. 23, 2010

(54) MANAGING A DIGITAL VIDEO RECORDER VIA A NETWORK

(75) Inventor: Belton L. Monroe, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1116 days.

(21) Appl. No.: 11/324,870

(22) Filed: Jan. 3, 2006

(65) Prior Publication Data

US 2007/0154170 A1 Jul. 5, 2007

(51) Int. Cl.
*H04N 5/91* (2006.01)
*H04N 5/00* (2006.01)

(52) U.S. Cl. ........................................ 386/83; 386/125
(58) Field of Classification Search ............... 386/83, 386/124, 125, 46, 45, 92, 95
See application file for complete search history.

(56) References Cited

U.S. PATENT DOCUMENTS

| 6,658,663 | B1 | 12/2003 | Bruynsteen | 725/134 |
| 6,788,882 | B1 | 9/2004 | Geer et al. | 386/116 |
| 2005/0210395 | A1* | 9/2005 | Wakita et al. | 715/753 |

FOREIGN PATENT DOCUMENTS

EP 1152609 11/2001

JP 2003224671 A 8/2003

OTHER PUBLICATIONS

Chorianopoulos et al., "Affective Usability Evaluation for an Interactive Music Television Channel", ACM Computers in Entertainment, vol. 2, No. 3, Jul. 2004, Article 7b, pp. 1-11.
Mani et al., "The Networked Home as a User-Centric Multimedia System", ACM Digital Library, ACM 1-58113-935-7/04/0010, NRBC'04, Oct. 2004, New York, USA, pp. 19-30.
Cranor et al., "Design and Implementation of a Distributed Content Management System", ACM Digital Library, ACM 1-58113-694-03/03/0006, NOSSDAV'03, Jun. 2003, California USA, pp. 4-11.
Tokmakoff, "Avatars, interaction and next-generation television", INSPEC AN-7540767, Proceedings 2002 IEEE International Conference on Multimedia and Expo, Lausanne, Switzerland Aug. 2002.

* cited by examiner

*Primary Examiner*—Robert Chevalier
(74) *Attorney, Agent, or Firm*—Yee & Associates, P.C.; John R. Pivnichny (57) ABSTRACT

The aspects of the present invention provide a computer implemented method, system, and computer usable program code for managing programming for a digital video recorder via a network. The method includes receiving user instructions at a content manager, wherein the content manager receives the user instructions through a network. The method also includes executing the user instructions to schedule recording of content for the user. The method further includes responsive to a plurality of users designating the content, storing only a single instance of the content designated by the plurality of users to form common stored content. The method is also responsive to a request to view the content from a user in the plurality of users, transmitting the common stored content to the user in the plurality of users over the network.

18 Claims, 8 Drawing Sheets

MANAGING A DIGITAL VIDEO RECORDER VIA A NETWORK

BACKGROUND OF THE INVENTION

1. Field of the Invention

The present invention relates generally to an improved data processing system, and in particular to a method and apparatus for managing data. Still more particularly, the present invention relates to a computer implemented method, apparatus, and computer usable program code for managing a digital video recorder system via the internet.

2. Description of the Related Art

The digital video recorder (DVR) is an electronic device that records television programs in a digital format. The digital video recorder, also known as a personal video recorder or digital personal video recorder, was first introduced into the market as a replacement for the traditional videocassette recorder (VCR). The digital video recorder operates like a small computer—the device records to a hard drive and has a consumer-friendly interface device.

A user interfaces with a digital video recorder using a remote control and programs the digital video recorder through an interface screen, provided by a component in the digital video recorder, such as a content manager. The content manager uses a graphical user interface (GUI) as an interface to receive input and present output to a user. The programmed information is stored in a hard-wired media such as a non-replaceable hard drive. In general, the digital video recorder storage capacity is limited to the hard drive size and additional storage space is difficult to add. Furthermore, any program information stored on the hard-wired media is non-transferable. Therefore, whenever the digital video recorder unit is replaced for maintenance, repair, or upgrade, the program information currently stored in the digital video recorder is lost. The user reprograms all the lost information back into the replacement digital video recorder each time the digital video recorder is replaced.

The digital video recorder permits users to program and view recorded content through the digital video recorder unit itself. Content can be anything that can be sent digitally or by video or audio. Thus, content includes things that have a scheduled time for broadcasting, such as an episode of a show, a song, a movie, a music video, a documentary, or a news broadcast. Content can also be a digital picture in which a user can upload. Typically, a user connects the digital video recorder unit to a television set and views the recorded content through the television set. A digital video recorder is not adapted to connect with other media units, such as a personal computer, a cell phone, or a personal digital assistant (PDA) unit. Thus, a user is limited to watching recorded content at a location where the digital video recorder unit is connected to a television set. Furthermore, since programs can only be viewed through the digital video recorder unit itself, a user cannot easily share a recorded program with other users. Unlike a video cassette recorder, a digital video recorder does not have a separate video cartridge to record programs on and easily loan to another user. Instead, a user must borrow the entire digital video recorder unit itself to watch a recorded program, which is cumbersome and inconvenient. A digital video recorder, however, does allow users to download to a video recorder then give the video to a friend, but then a user would need access to both a digital video recorder and video recorder.

SUMMARY OF THE INVENTION

The aspects of the present invention provide a computer implemented method, system, and computer usable program code for managing programming for a digital video recorder via a network. The method includes receiving user instructions at a content manager, wherein the content manager receives the user instructions through a network. The method also includes executing the user instructions to schedule recording of content for the user. The method further includes responsive to a plurality of users designating the content, storing only a single instance of the content designated by the plurality of users to form common stored content. The method is also responsive to a request to view the content from a user in the plurality of users, transmitting the common stored content to the user in the plurality of users over the network.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
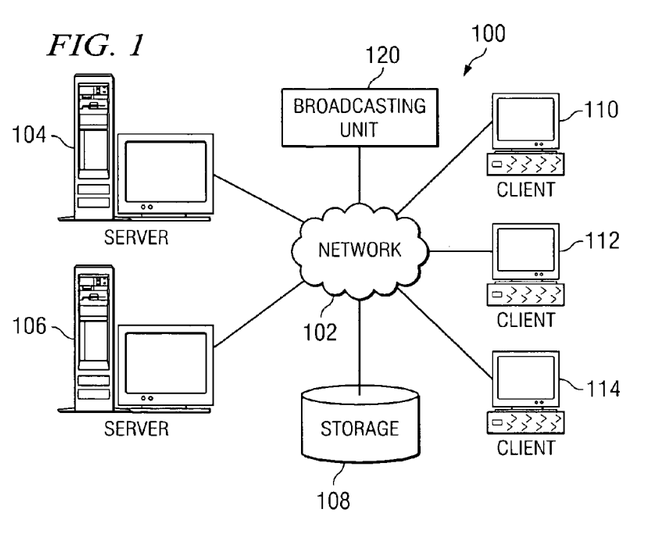
FIG. 1 depicts a network of data processing systems in which aspects of the present invention may be implemented.
Figure 2:
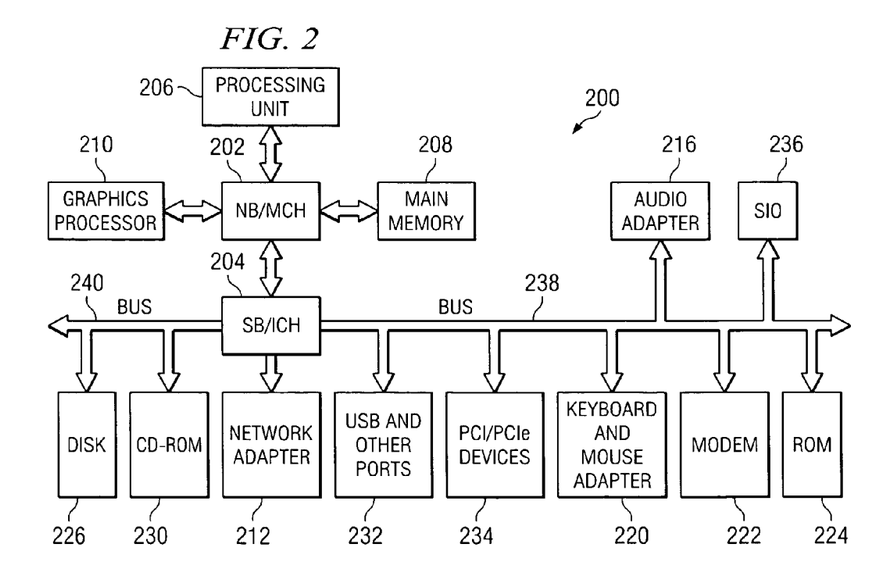
FIG. 2 depicts a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, users 110, 112, and 114 connect to network 102. These users 110, 112, and 114 may be, for example, personal computers or network computers. In the depicted example, server 104 provides data, such as boot files, operating system images, and applications to users 110, 112, and 114. Users 110, 112, and 114 are users to server 104 in this example. Network data processing system 100 may include additional servers, users, and other devices not shown.

In the depicted example, broadcasting unit 120 is also connected to network 102. Broadcasting unit 120 is any media broadcasting station which broadcasts media through network 102. Broadcasting unit 120 may broadcast over the air or through other media, such as a cable network system.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or user 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a user, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide a computer implemented method, apparatus, and computer usable program code for managing, recording, and playback of content. The aspects of the present invention receive user instructions from a content manager, where the content manager receives the instructions through a network. The aspects of the present invention also include executing the user instructions to schedule the recording of the content for the user. The aspects further include storing only a single instance of the content designated by a plurality of users to form common stored content. The illustrative embodiments are also responsive to a request to view the content from a user in the plurality of users and transmit the common stored content to the user over the network. In the manner presented, the aspects of the present invention also provide a system and computer usable program code for managing the digital video recorder via a network.

Figure 3:
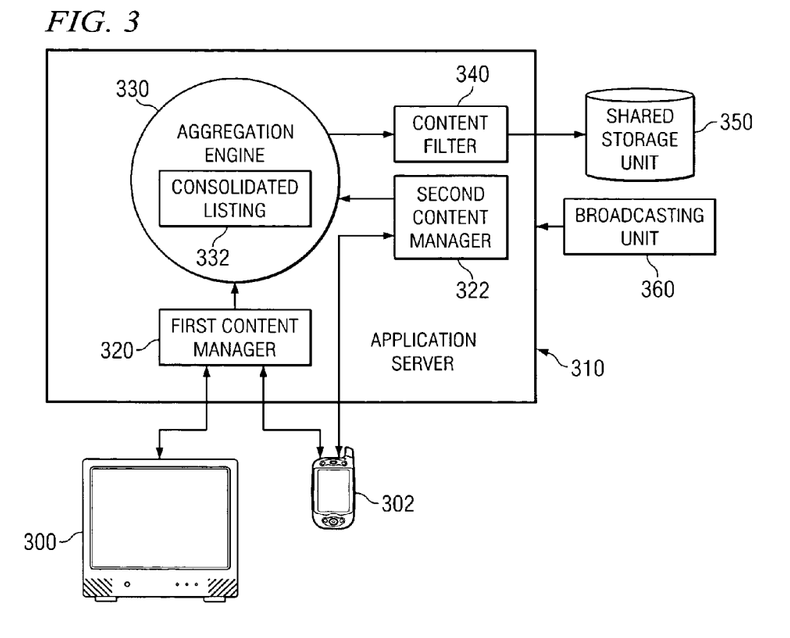
FIG. 3 illustrates a digital video recording system in which aspects of the present invention may be implemented.

FIG. 3 illustrates a digital video recording system in which aspects of the present invention may be implemented. The digital video recording system includes television 300, personal digital assistant (PDA) 302, application server 310, shared storage unit 350, and broadcasting unit 360. In the illustrative embodiment, data processing systems such as television 300 and personal digital assistant 302 are connected to a network such as the one depicted in FIG. 1. Television 300 and personal digital assistant 302 provide an interface for managing a user's personal content manager.

Television 300 is connected to a local digital video recording unit, local cable box unit, or any other local storage unit, which in turn is connected to the network. A user creates, updates, and modifies programming using a content manager which is displayed as a graphical user interface (GUI) on television 300. The digital video recording unit, local cable box unit, or any other local storage unit obtains the user's individual account and content manager from the network and displays the information through television 300. Users also view recorded content on television 300.

Portable data processing systems, such as personal digital assistant 302, offer users flexibility and mobility in managing programming and viewing recorded content. Much like television 300, users create, update, and modify programming through a content manager on personal digital assistant 302. However, personal digital assistant 302 can connect directly with the network and download account information and a user's content manager. Additionally, personal digital assistant 302 is portable and allows users to view recorded content wherever the user is located, as long as a network connection capable of reaching application server 310 exists.

In the illustrative embodiment, application server 310 includes first content manager 320, second content manager 322, aggregation engine 330, and content filter 340. Application server 310 can have more or less content managers, but typically has at least one content manager. A content manager is initiated each time a user logs on to a data processing system, such as television 300 or personal digital assistant 302, to make programming changes or view recorded content. Multiple users can pull up their individual content managers on the same data processing system. A data processing system is not limited to a single user or a single content manager.

First content manager 320 and second content manager 322 provide the users of television 300 and personal digital assistant 302 respectively with a set of program choices. A set of program choices can be a list of either one or more programs. A program can be any broadcast, such as an episode of a television show, a song from a radio program, a movie, news commentary, or any combination thereof, transmitted through a media unit.

Each user selects what programs to record from the set of program choices. From the list of selected programs, first content manager 320 and second content manager 322 generate either a new personal listing of program choices for each user or add to a current list if a personal listing of program choices already exists. The personal listing may include the channel of the show to record, the name of the program to be recorded, and the date and time of the content to be recorded. The personal listing may also include a request to record all shows with the same title shown during a period of time on any channel or only the episodes showing for the first time. In some cases, the personal listing may also include preference recommendations in which the digital video recording system analyzes the viewing preferences of the user and recommends additional programs that the user may be interested in.

The personal listing of program choices recorded in first content manager 320 and second content manager 322 are consolidated into a single list (consolidated listing 332) using aggregation engine 330. Aggregation engine 330 sorts the information from first content manager 320 and second content manager 322 and creates a single list of content to be recorded. The list of content is a complete list of programs requested to be recorded. Each program from first content manager 320 and second content manager 322 appears only once in the list, even if both content managers request the same content. For example, if first content manager 320 requests to record content A, B, and C and second content manager 322 requests to record content A, C, and D, the list generated by aggregation engine 330 will show a request to record content A, B, C, and D. The list will not display a request to record content A, A, B, C, C, and D. In these illustrative examples, each content item, A, B, C, and D, will only be listed once even if the same content is requested by multiple content managers. As a result, only a single instance of a particular content is recorded and stored.

Information in first content manager 320 and second content manager 322 can be shared among different users. Thus, the user for television 300 can give the user for personal digital assistant 302 permission to view information in first content manager 320. The user for television 300 can also limit what information can be accessed by the user for personal digital assistant 302. Additionally, the user for personal digital assistant 302 can download and view content requested in first content manager 320. Thus, if user for personal digital assistant 302 fails to list a particular content item in second content manager 322, the user for personal digital assistant 302 can still download and watch the content because the user for television set 300 has already requested it.

Content filter 340 resides in application server 310 and interfaces with application engine 330. Content filter 340 may be any data processing system with the capability of receiving digital, video, or audio content. Content filter 340 has a mechanism to filter content and is able to separate desirable and undesirable content based on a pre-determined list, or according to the aspects of the present invention, based on consolidated listing 332.

Aggregation engine 330 sends consolidated listing 332 to content filter 340. Content filter 340 uses consolidated listing 332 to determine what content to record. Content filter 340 receives content from broadcasting unit 360 and filters the received content for content listed on consolidated listing 332. Content filter 340 then sends the filtered content to shared storage unit 350.

Shared storage unit 350 interfaces with application server 310 and stores content requested by first content manager 320 and second content manager 322. Content filter 340 sends content requested on consolidated listing 332 to shared storage unit 350. Shared storage unit 350 only stores a single instance of the content in order to maximize shared storage space. Shared storage unit 350 acts as a repository of content for all users. When an individual user wishes to watch a particular content item, the user downloads the content from shared storage unit 350. Each individual shares the content from shared storage unit 350. Thus, a single instance of a particular content can be downloaded multiple times by multiple users.

Shared storage unit 350 allocates a certain amount of storage space for each user. Based on a user's subscription, each user is allowed to store a certain amount of content in shared storage unit 350. A user can easily increase the amount of storage space by changing subscriptions and requesting additional space on shared storage unit 350. In this manner, using the aspects of the present invention, a user is not limited by the maximum storage capacity of the user's individual digital video recording (DVR) unit. Instead, the user increases memory capacity by utilizing the space on shared storage unit 350.

Additionally, the method of storing only a single instance of content on shared storage unit 350 provides flexibility in allocating shared storage amounts. User account space can overlap since only a single instance of a particular content resides at one time in shared storage unit 350. Thus, more accounts can reside in a single shared storage unit 350. Additionally, shared storage unit 350 can easily be expanded. Since shared storage unit 350 is in a single location, additional storage space and memory can easily be added to accommodate more content and users. Furthermore, shared storage unit 350 could also be a distributed storage system, providing additional flexibility in expanding available storage.

Shared storage unit 350 maintains a copy of a particular content until all users indicate that the content can be deleted or until the program is deleted from all of the users' accounts through aging and user preferences on retaining the particular content. In other words, a user can either send a command to delete the content or manage when a program is to be deleted through the preferences on content retention. For example, a user preference may indicate that shared storage unit 350 keep only the first three episodes of a particular show or delete a certain movie if additional room for new content is required. A user preference may also indicate that a certain program is kept only for a certain amount of days and, after that time, the program can be deleted. Potentially, a particular content may perpetually reside in shared storage unit 350. However, the management of content through user preferences limits the possibility of content perpetually residing in shared storage unit 350.

Broadcasting unit 360 sends content to application server 310. Content filter 340 separates and filters the sent content and sends the filtered content to shared storage unit 350. Shared storage unit 350 records and maintains a single instance of content sent from content filter 340. First content manager 320 and second content manager 322 display the programming information for users to choose and manage the content to be recorded.

Figure 4:
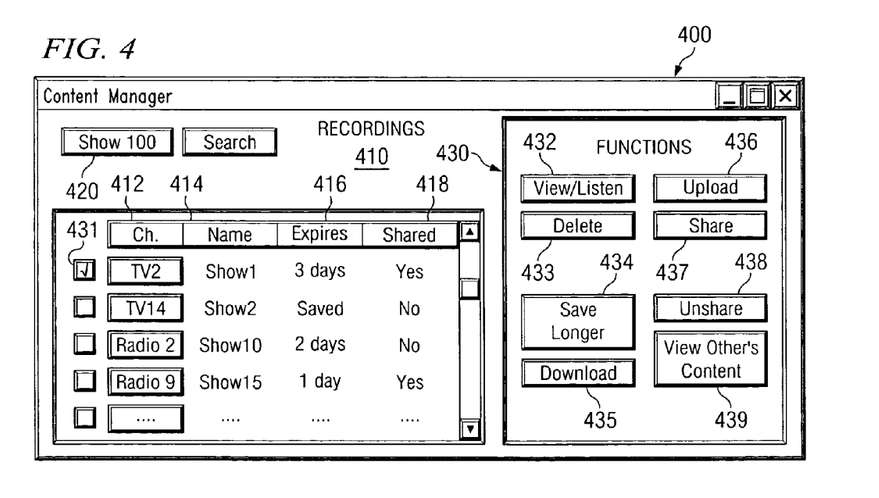
FIG. 4 depicts a graphical user interface for the content manager in which aspects of the present invention may be implemented.

FIG. 4 depicts a graphical user interface (GUI) for the content manager in which aspects of the present invention may be implemented. GUI 400 is visual illustration of the content manager on a data processing system such as the one in FIG. 3. GUI 400 includes recordings list 410, programming search window 420, and functions 430. Recordings list 410 is a list of content requested by the user and already stored in shared storage unit 350 of FIG. 3. Recordings list 410 lists channel 412, program name 414, expiration date 416, and whether the program is to be shared 418 for each program to be recorded. Channel 412 can be any media broadcasting means, including but not limited to a television station or a radio station. In the illustrative example, channel 412 lists television stations TV2 and TV14 and radio stations Radio 2 and Radio 9. The name of the recorded program is listed under name 414. Expires 416 details how many days are left before a recorded program expires or may be deleted. If a program is scheduled to reside perpetually in shared storage unit 350, expires 416 column will show "saved." In other embodiments, recordings list 410 may be a program guide from the broadcasting service provider. The program guide provides the user a list of programs from which the user may select and designate to record. If the user decides to share a particular program with other users, then a "yes" indicator is displayed in shared 418 column. If not, a "no" indicator is displayed in shared 418 column.

In the illustrative example, Show 1 on channel TV2 is to be saved for 3 more days before the Show 1 expires or is to be deleted because of the customer's preferences or a customer's limitation on allocated storage. Show 2 on channel TV14 is already recorded and will be saved indefinitely in a shared storage unit as illustrated in FIG. 3. Show 10 on Radio 2 is scheduled to be saved for 2 more days, and Show 15 is scheduled to be saved for 1 additional day. The user has elected to share Show 1 and Show 15 and not to share Show 2 and Show 10.

Programming search window 420 provides a mechanism for a user to find a certain program already recorded. Programming search window 420 allows the user to quickly reference and finds the program in recordings list 410. In the illustrative example, the user is trying to locate Show 100. The user is quickly brought to the first instance Show 100 is listed in recordings list 410. The user is brought to all instances of Show 100 if additional instances of show 100 are found in recordings list 410. In other embodiments, another window such as programming search window 420 may exist to allow the user to search through a programming guide sent by a broadcasting service provider. The search window would provide the user with the capability of finding which show or plurality of shows the user would like to designate to be recorded.

Functions 430 is an illustrative example of tasks available to a user to manage the digital video recorder system. Functions 430 will perform the task on the show or plurality of shows designated in column 431. The task is performed for every show or plurality of shows that have a checkmark in the box under column 431. For instance, in the illustrative example, a task from functions 430 will be performed on Show 1 since a checkmark for that show resides under column 431.

View/listen function 432 allows a user to view or listen to a program directly from the shared storage unit without downloading to the local digital video recorder unit itself or any other type of local storage. Delete function 433 erases the program from recordings list 410 and also indicates to the shared storage unit that the stored program may be deleted if no other user requests the program to be maintained. Save longer function 434 extends the amount of time a program is saved within the shared storage unit. Thus, save longer function 434 extends the number of days that are reflected in expires column 416. For example, save longer function 434 may allow a user to save a program indefinitely or save a program for three more days.

Download function 435 downloads the recorded program from the shared storage unit to the media unit. Upload function 436 uploads content from a local storage unit, such as a digital video recorder, to the shared storage unit and makes the content accessible through the content manager. Share function 437 allows a user to designate a particular program to be shared with other users. Unshare function 438 removes a particular program from being shared with other users. View other's content function 439 allows the user to view the content manager of other users. The other users have to grant access to the user in order for the user to view the other users' content managers.

Figure 5A:
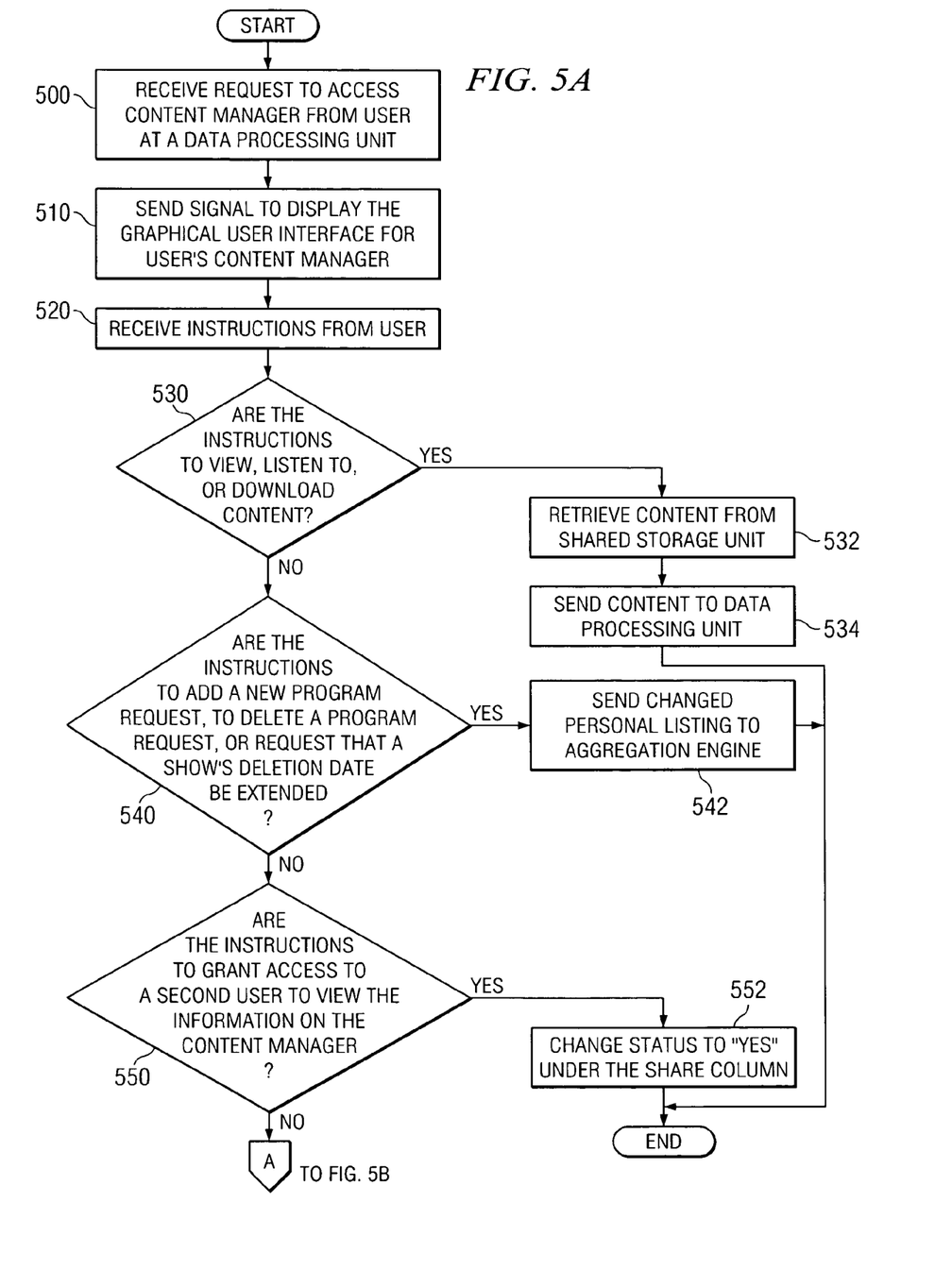
FIGS. 5A and 5B are a flowchart of a process for managing a digital video recording system within a content manager, in accordance with an illustrative embodiment of the present invention.
Figure 5B:
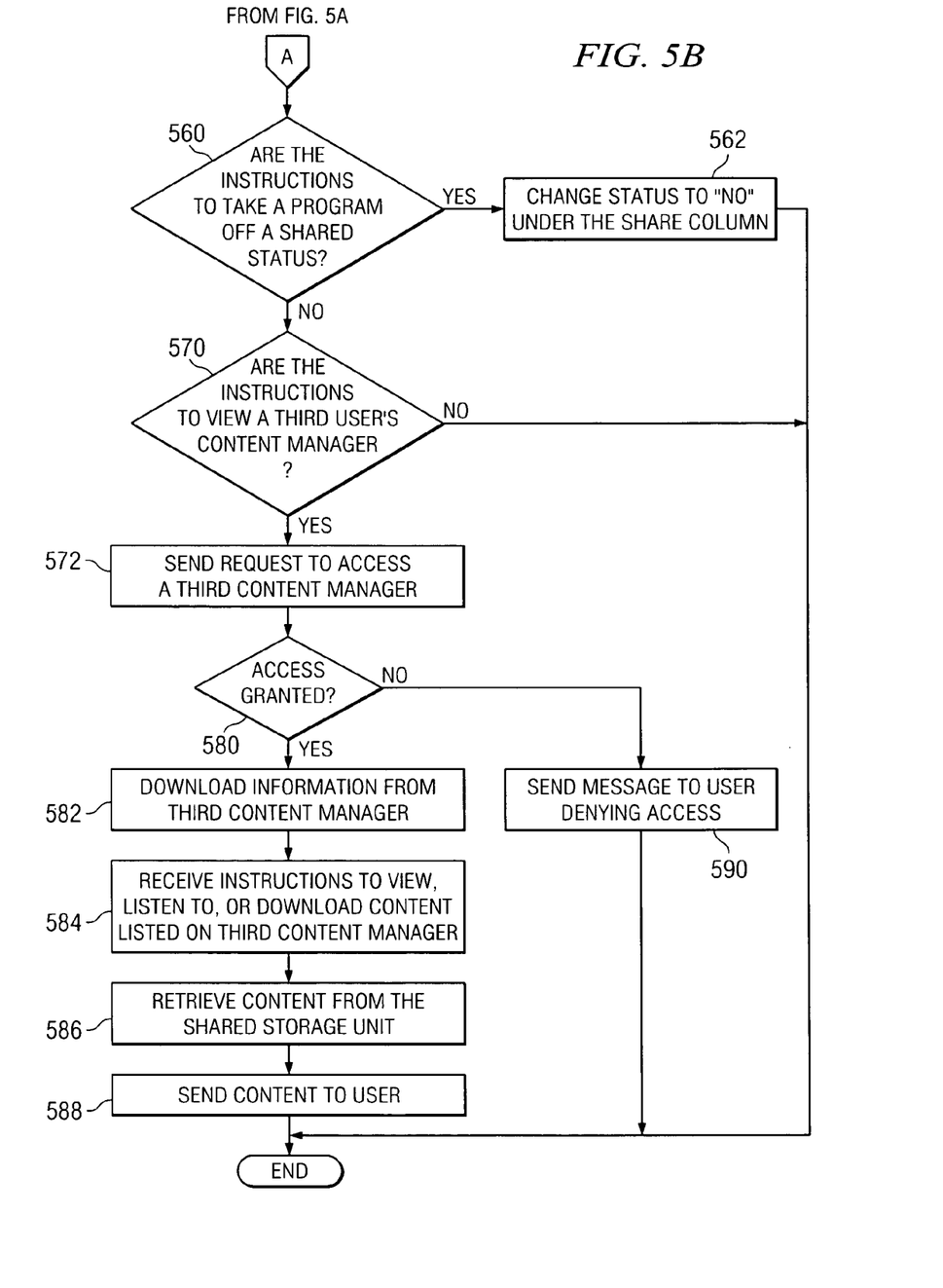

FIGS. 5A and 5B are a flowchart of a process for managing a digital video recording system within a content manager, in accordance with an illustrative embodiment of the present invention. The process is executed in a content manager like first content manager 320 and second content manager 322 of FIG. 3. The process begins with a content manager receiving a request to access the content manager (step 500). The request originates from a user located at a data processing unit. After the request is received, the content manager sends a signal to the data processing unit to display a graphical user interface (GUI) showing the user's content manager (step 510). The content manager then receives instructions from the user (step 520).

After receiving the instructions, the content manager then makes a series of determinations to establish the content manager's next steps. The content manager first determines whether the instructions are to view, listen, or download content (step 530). If the instruction is to view, listen to or download content ("yes" output of step 530), then the content manager retrieves the requested content from the shared storage unit (step 532) and sends the content to data processing unit (step 534). The shared storage unit is similar to shared storage unit 340 of FIG. 3. If the instruction is not to view, listen to, or download content ("no" output of step 530), then the content manager determines whether the instruction is to add a new program request, to delete a program request, or request that a show's deletion date be extended. (step 540). If the instruction is to add, delete, or extend the deletion date ("yes" output of step 540), then the content manager sends the changed personal listing to the aggregation engine (step 542). The changed personal listing reflects the instruction to add, delete, or extend the deletion date. The aggregation engine is similar to aggregation engine 330 of FIG. 3.

If the instruction is not to add, delete, or extend the deletion date ("no" output of step 540), then the content manager decides whether the instructions are to grant access to a second user to view the information on the content manager (step 550). Access may also be granted to a plurality of other users and is not limited to just a second user. If the instruction is to grant access ("yes" output of step 550), access is allowed and the status is changed to "yes" under the shared column as exemplified in FIG. 4 (step 552).

If the instruction is not to grant access ("no" output of step 550), then the content manager determines whether the instructions are to take a program off of shared status (step 560). If the instruction is take a program off shared status ("yes" output of step 560), access is blocked to that program and the status is changed to "no" under the shared column (step 562).

If the instruction is not to take a program off shared status ("no" output of step 560), then the content manager determines whether the instructions are a request to view a third user's content manager (step 570). The request may be to view the second user's or any number of user's content manager and is not limited to only the third user's content manager. If the instructions are a request to view ("yes" output to step 570), then the content manager sends a request to access the third content manager (step 572). Then, the content manager determines whether the third content manager grants access to the content manager (step 580). If access is granted by the third content manager ("yes" output to step 580), then the content manager uploads the information accessible to the user from the third content manager (step 582). The content manager may then receive instructions to view, listen to, or download the content listed on the third content manager (step 584). The content manager then retrieves the requested content from the shared storage unit (step 586), and then the content manager sends content to the user (step 588).

If access is denied to the user ("no" output to step 590), then the content manager sends a message to the user at the data processing unit indicating that access to the second content manager is denied (step 590). If the instructions are not to view a second user's content ("no" output to step 570), then the process ends since no other instructions, in the aspects of the present invention, are available.

Figure 6:
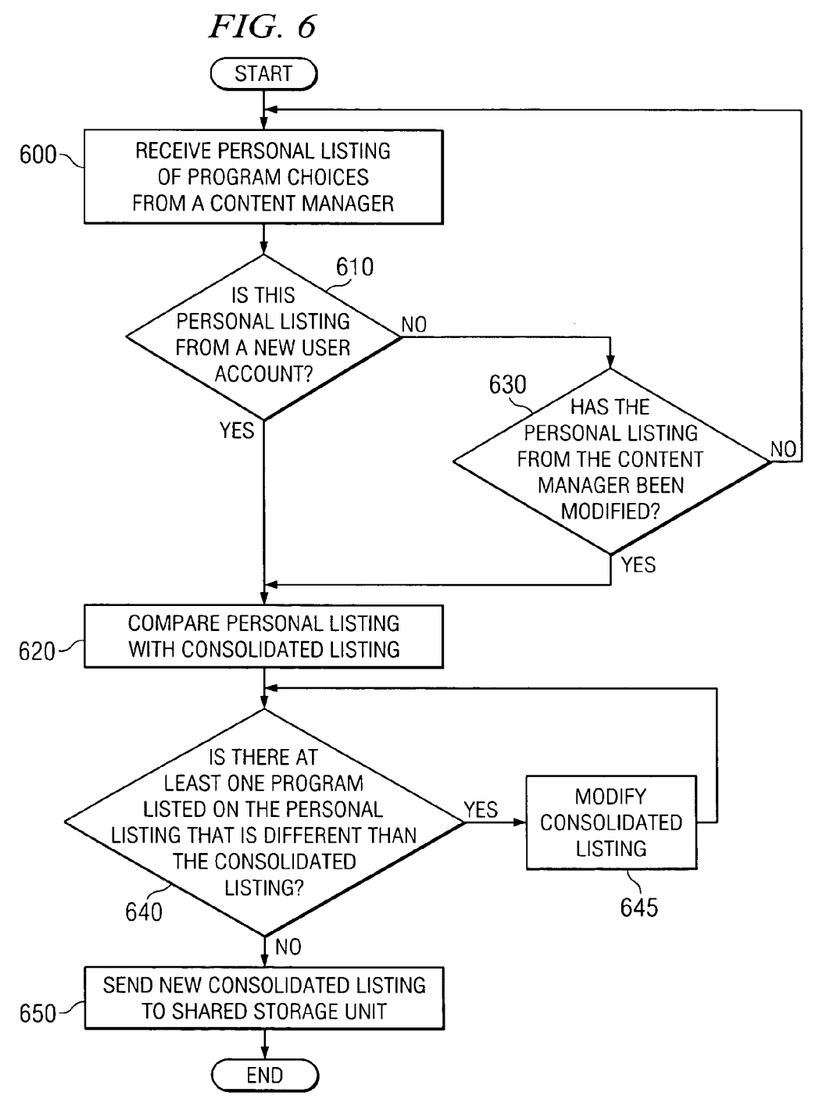
FIG. 6 is a flowchart of a process for managing a digital video recording system within an aggregation engine, in accordance with an illustrative embodiment of the present invention.

FIG. 6 is a flowchart of a process for managing a digital video recording system within an aggregation engine, in accordance with an illustrative embodiment of the present invention. The aggregation engine described is similar to aggregation engine 330 of FIG. 3. The process begins with an aggregation engine receiving a personal listing of program choices from a content manager, such as first content manager 320 and second content manager 322 of FIG. 3 (step 600). The aggregation engine then determines whether the personal listing is from a new user account (step 610). If the personal listing is from a new user account ("yes" output to step 610), then the aggregation engine compares the personal listing from the new user account with the consolidated listing existing in the aggregation engine already (step 620). If the personal listing is not from a new user account ("no" output to step 610), then the aggregation engine determines whether the personal listing from the content manager was modified (step 630). If the personal listing of program choices is modified ("yes" output to step 630), then the aggregation engine compares the personal listing with the consolidated listing existing in the aggregation engine (step 620). If the personal listing of program choices is not modified, then the process returns to step 600 and another personal listing is received from another content manager.

Once the personal listing is compared with the consolidated listing (step 620), then the aggregation engine determines whether at least one program listed in the personal listing differs from the consolidated listing (step 640). In other words, the aggregation engine determines whether a program needs to be added or a program needs to be deleted. A program is added to the consolidated list if the program is not presently listed in the consolidated list. A program is deleted from the consolidated list if the program is not listed in the personal listing anymore and no other personal listing from other users requests the program.

If at least one program differs ("yes" output of step 640), then the aggregation engine modifies the consolidated list (step 645). The process then returns to step 640 to determine whether another program in the personal listing differs from the consolidated listing. The process repeats until all the programs that differ ("yes" output of step 640) are reflected in the consolidated listing. Once all the programs are reflected in the consolidated listing ("no" output of step 640), then the new consolidated listing is send to the shared storage unit, like the one depicted in FIG. 3, and the process ends.

Figure 7:
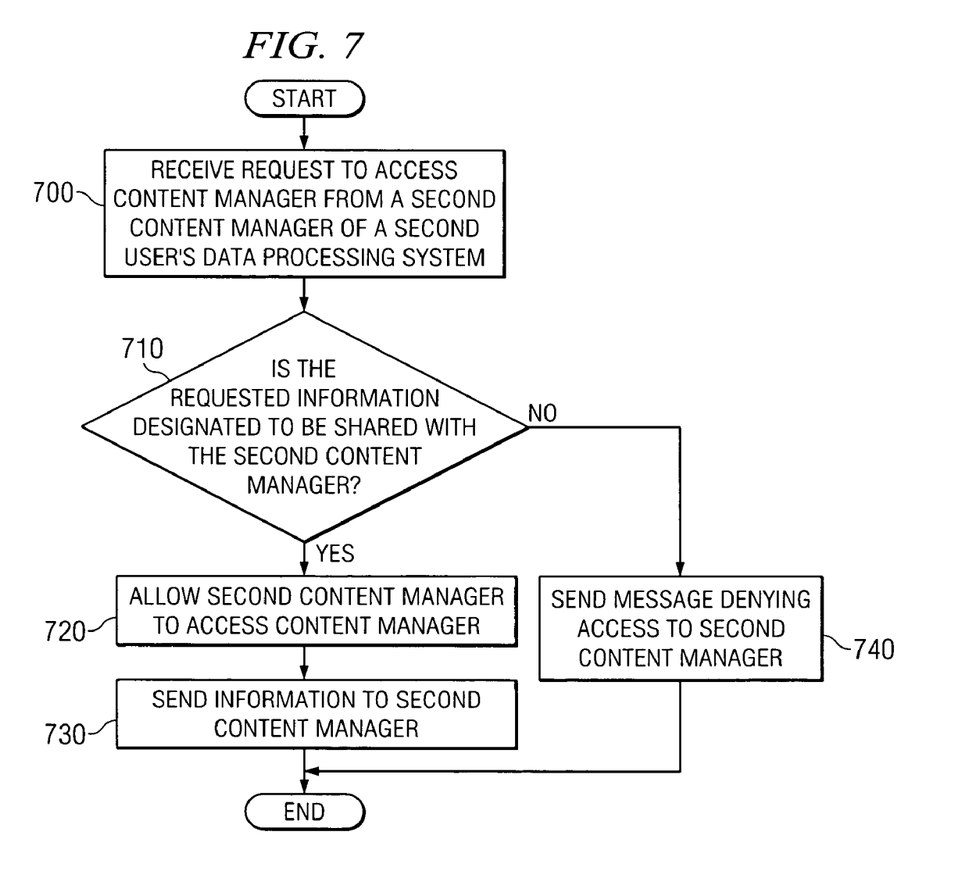
FIG. 7 is a flowchart of a process for sharing a content manager with another user, in accordance with an illustrative embodiment of the present invention.

FIG. 7 is a flowchart of a process for sharing a content manager with another user, in accordance with an illustrative embodiment of the present invention. The process begins with a content manager, such as first content manager 320 and second content manager 322 of FIG. 3, receiving a request to access the content manager from a second content manager of a second user at a data processing system (step 700). The content manager then determines whether the information requested by the second content manager is designated to be shared with the second user (step 710). The information is typically a program choice selected by the user already listed in the personal listing of the content manager. If the information is designated to be shared ("yes" output of step 710), then the content manager allows the second content manager to access the information from the content manager (step 720). After access is allowed, then the content manager sends the information to the second content manager (step 730) and the process ends. If the information is not designated to be shared ("no" output of step 710), then the content manager sends a message denying access to the second content manager (step 740) and the process ends.

Figure 8:
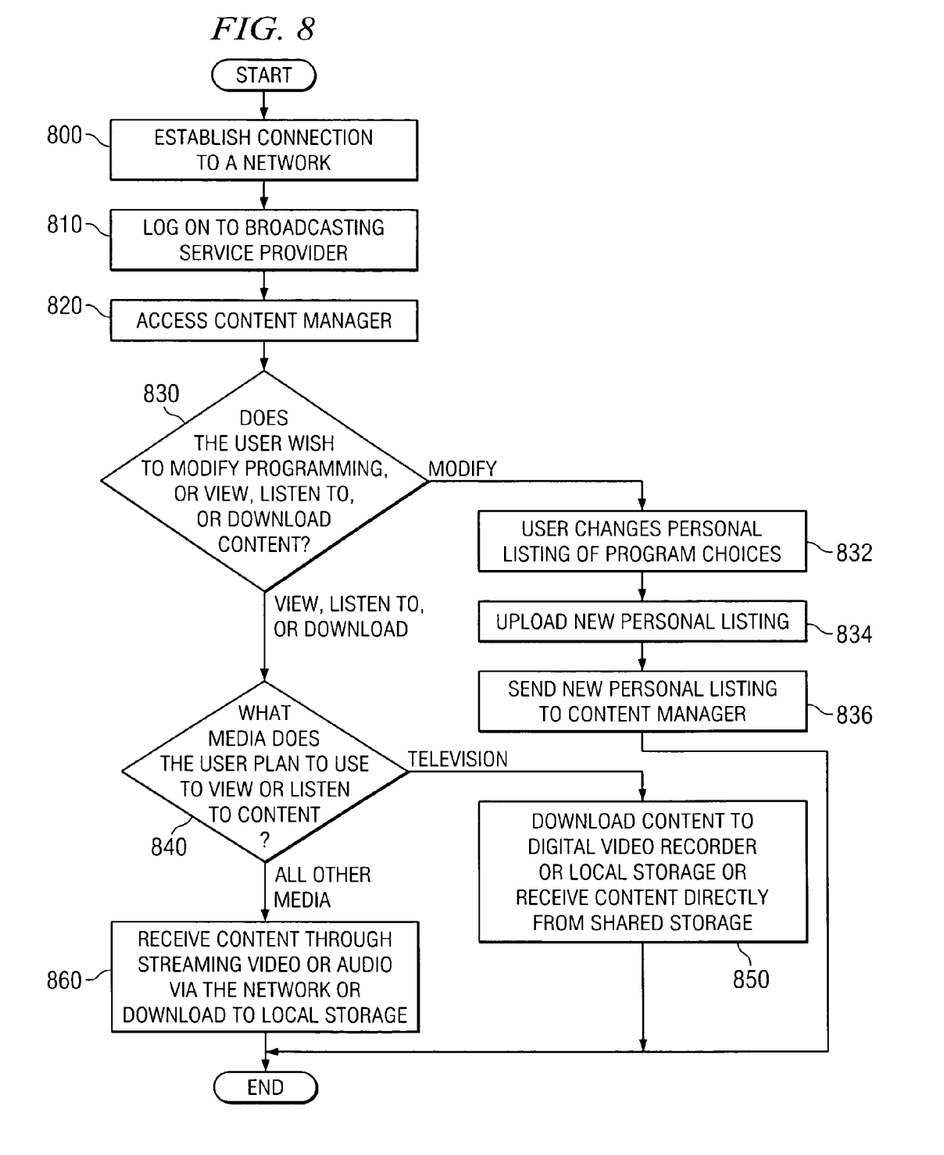
FIG. 8 is a flowchart of a process for managing a data processing system within a data processing system, in accordance with an illustrative embodiment of the present invention.

FIG. 8 is a flowchart of a process for managing a data processing system within a data processing system, in accordance with an illustrative embodiment of the present invention. The data processing system described is similar to television 300 and personal digital assistant 302 of FIG. 3. The process begins with the data processing system establishing a connection to a network (step 800). Then, the data processing system logs on to the webpage of a broadcasting service provider (step 810). The broadcasting service provider is the service provider of a broadcasting unit, such as broadcasting unit 350 of FIG. 3. The data processing system then accesses the user's personal content manger (step 820). The user's personal content manager is similar to the first content manager 320 and second content manager 322 of FIG. 3.

The data processing unit then determines whether the user wishes to modify the programming or view, listen to, or download content (step 830). If the user wishes to modify the programming ("modify" output of step 830), then the user changes the personal listing of program choices (step 832) and the data processing system uploads the new personal listing of program choices (step 834). Then, the data processing system sends the personal listing to the content manager (step 836) and the process ends.

If, on the other hand, the user wishes to view, listen to, or download content ("view, listen to, or download" output of step 830), then the data processing system then determines what media the user plans on using to view or listen to the content. If the user plans on viewing content through a television set ("television" output of step 840), then the television set will either download content to a digital video recorder or any other local storage or receive content directly from shared storage (step 850). If the user plans to view or listen to content through any other media, such as a personal computer, laptop computer, or personal digital assistant, ("all other media" output of step 840), then the media will receive content through streaming video or audio via the network or download to local storage (step 860).

Figure 9:
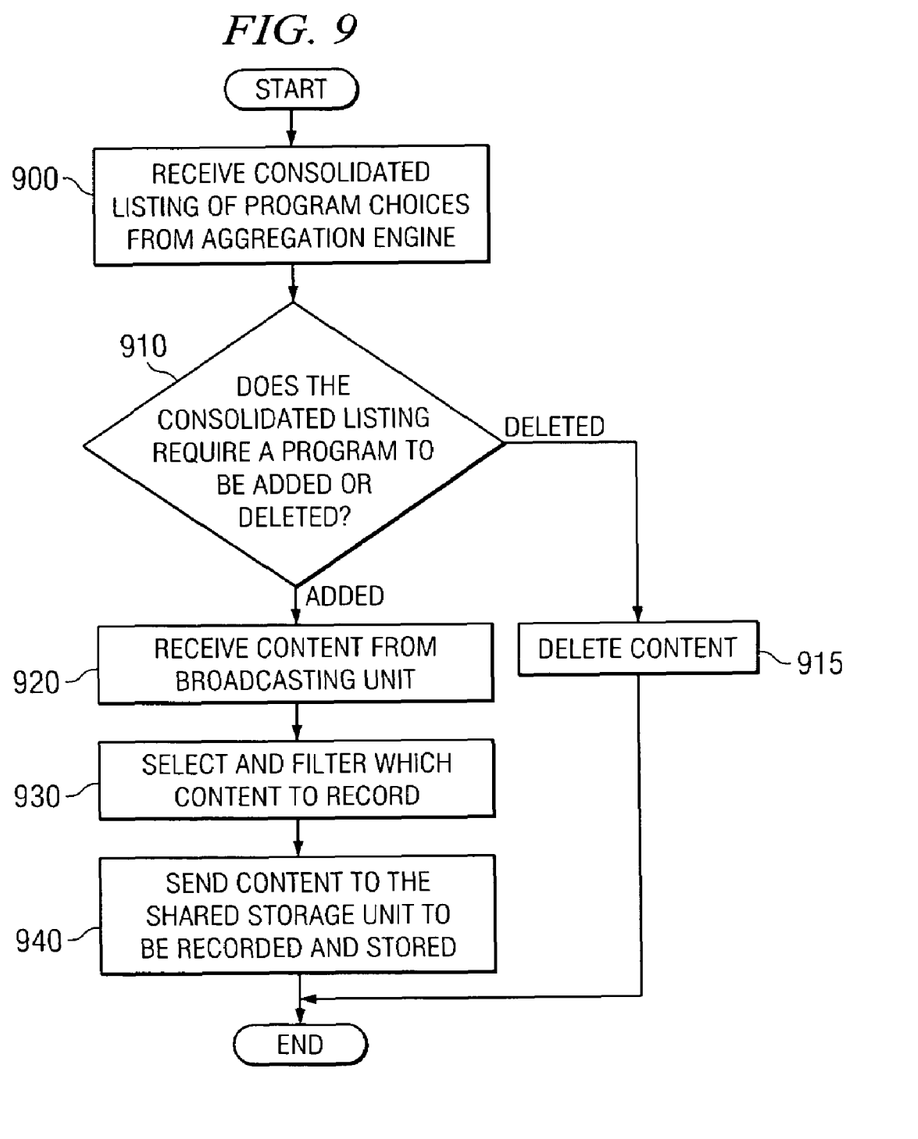
FIG. 9 is a flowchart of a process for managing a data processing system within a shared storage unit, in accordance with an illustrative embodiment of the present invention.

FIG. 9 is a flowchart of a process for managing a data processing system within a content filter, in accordance with an illustrative embodiment of the present invention. The content filter is similar to content filter 340 of FIG. 3. The process begins with the content filter receiving a consolidated listing of program choices from an aggregation engine, such as aggregation engine 330 of FIG. 3 (step 900). The content filter then determines whether the consolidated listing requires a program to be added or if a program is to be deleted (step 910). If a program is to be deleted ("deleted" output of step 910), then the content filter sends a message to shared storage to delete the content (step 915).

If a program is to be added ("added" output of step 910), then the content filter receives content from a broadcasting unit (step 920). The broadcasting unit is similar to broadcasting unit 350 of FIG. 3. The content filter then selects and filters the content to be recorded based on the programs listed on the consolidated listing (step 930). Then, the content filter sends the filtered content to the shared storage unit, such as shared storage unit 350 of FIG. 3. The shared storage unit records and stores the sent content. The process then ends.

The aspects of the present invention provide a computer implemented method, apparatus, and computer usable program code for managing, recording, and playback of content. The aspects of the present invention receive user instructions from a content manager, where the content manager receives the instructions through a network. The aspects of the present invention also include executing the user instructions to schedule the recording of the content for the user. The aspects further include storing only a single instance of the content designated by a plurality of users to form common stored content. The illustrative embodiments are also responsive to a request to view the content from a user in the plurality of users and transmit the common stored content to the user over the network. In the manner presented, the aspects of the present invention also provide a system and computer usable program code for managing the digital video recorder via a network.

The aspects of the present invention allow a user to remotely program a digital video recorder and view recorded content using other media units, such as a personal computer, laptop computer, or personal digital assistant. The aspects of the present invention also allow a user to maintain program information, without requiring the user to reprogram the digital video recorder each time the unit is replaced. The aspects of the present invention further allow a user to easily expand the storage capacity amount without purchasing a new digital video recorder. Additionally, the aspects of the present invention allow friends to view recorded content that the friends forgot to record or did not program correctly in their own digital video recorder.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing programming for a digital video recorder, the computer implemented method comprising:
   receiving user instructions at a content manager, wherein the content manager receives the user instructions through a network;
   executing the user instructions to schedule recording of content for a user;
   responsive to a plurality of users designating the content, storing only a single instance of the content designated by the plurality of users to form common stored content; and
   responsive to a request to view the content from a user in the plurality of users, transmitting the common stored content to the user in the plurality of users over the network.

2. The computer implemented method of claim 1 further comprising:
   deleting the common stored content when all of the plurality of users have indicated that the common stored content is to be deleted.

3. The computer implemented method of claim 1, wherein the user instructions identifies a set of program choices and wherein the executing step comprises:
   generating a personal listing of program choices in response to the user instructions.

4. The computer implemented method of claim 1, wherein the executing step comprises:
   consolidating the user instructions of a plurality of users into a common content list using an aggregation engine.

5. The computer implemented method of claim 1, wherein the storing step comprises:
   limiting an amount of storage a user retains in the common stored content.

6. The computer implemented method of claim 1, further comprising the step of:
   sharing the content designated by the user with the plurality of users.

7. The computer implemented method of claim 1, wherein the step of storing comprises:
   receiving content from a broadcasting unit; and
   selecting to store the content designated by the plurality of users for storage.

8. A system for managing a digital video recorder unit via a network comprising:
   a plurality of data processing systems connected to the network, wherein the data processing systems each provide an interface for managing a content manager;
   an application server interfacing with the data processing systems, wherein the content manager executes within the application server and wherein the content manager provides a plurality of users with a personal listing of program choices;
   a shared storage unit interfacing with the application server, wherein the shared storage unit stores content and
   an aggregation engine within the application server, wherein the aggregation engine consolidates the personal listing of program choices from the plurality of users to create a consolidated personal listing.

9. The system of claim 8, wherein the shared storage unit utilizes the consolidated personal listing to manage the content and wherein the shared storage unit maintains only a single copy of the content.

10. The system in claim 8, wherein the shared storage unit has an allocated storage amount limiting an amount of the content a user may retain in the shared storage unit.

11. The system in claim 8, wherein the content manager allows a user to share content with other users.

12. The system in claim 8, further comprising a media unit connected to the network, wherein the media unit shows the content selected by a user.

13. The system in claim 8 further comprising:
   a broadcasting unit sending content to the shared storage unit.

14. A computer program product recorded on a computer readable storage medium including computer program instructions for managing a digital video recorder unit via a network comprising:
   computer program instructions for causing an instruction execution system to receive user instructions at a content manager, wherein the content manager receives the user instructions through a network;
   computer program instructions for causing an instruction execution system to execute the user instructions to schedule recording of content for a user;
   computer program instructions for causing an instruction execution system, responsive to a plurality of users designating the content, to store only a single instance of the content designated by the plurality of users to form common stored content; and
   computer program instructions for causing an instruction execution system to respond to a request to view the content from a user in the plurality of users by transmitting the common stored content to the user in the plurality of users over the network.

15. The computer program product of claim 14 further comprising:
   computer program instructions for causing an instruction execution system to delete the common stored content when all of the plurality of users have indicated that the common stored content is to be deleted.

16. The computer program product of claim 14, wherein the user instructions identifies a set of program choices and wherein the computer program instructions comprises:
   computer program instructions for causing an instruction execution system to generate a personal listing of program choices in response to the user instructions.

17. The computer program product of claim 14, wherein the computer program instructions comprises:
   computer program instructions for causing an instruction execution system to consolidate the user instructions of a plurality of users into a common content list using an aggregation engine.

18. The computer program product of claim 17, further comprising:
   computer program instructions for causing an instruction execution system to utilize the common content list to manage the common stored content; and
   computer program instructions for causing an instruction execution system to share the content designated by a user with the plurality of users.

* * * * *